US006880813B2

(12) United States Patent
Yazici et al.

(10) Patent No.: US 6,880,813 B2
(45) Date of Patent: Apr. 19, 2005

(54) OUTLET SILENCER FOR COOLING TOWER, EVAPORATOR COOLER OR CONDENSER

(75) Inventors: Muammer Yazici, Toronto (CA); Ming Hui Han, Mississauga (CA)

(73) Assignee: M & I Heat Transfer Products Ltd., Mississauga (CA)

(*) Notice: Subject to any disclaimer, the term of this patent is extended or adjusted under 35 U.S.C. 154(b) by 0 days.

(21) Appl. No.: 10/760,660

(22) Filed: Jan. 15, 2004

(65) Prior Publication Data

US 2004/0150124 A1 Aug. 5, 2004

Related U.S. Application Data

(62) Division of application No. 10/150,636, filed on May 17, 2002, now abandoned.

(51) Int. Cl.[7] ................................................. B01F 3/04
(52) U.S. Cl. ........................... 261/29; 261/98; 261/111; 261/DIG. 11; 181/224; 181/225; 415/119
(58) Field of Search .............................. 261/29, 30, 98, 261/111, DIG. 11; 181/224, 225, 256; 415/119; 454/186, 906

(56) References Cited

U.S. PATENT DOCUMENTS

| | | |
|---|---|---|
| 3,452,667 A | 7/1969 | Coleman et al. |
| 3,840,067 A | 10/1974 | Bos |
| 4,232,729 A | 11/1980 | Ingram et al. |
| 4,287,962 A | 9/1981 | Ingard et al. |
| 4,986,170 A | 1/1991 | Ramakrishnan et al. |
| 5,426,268 A | 6/1995 | Yazici et al. |
| 5,587,563 A | 12/1996 | Yazici et al. |
| 5,663,535 A | 9/1997 | MacDonald et al. |
| 5,728,979 A | 3/1998 | Yazici et al. |
| 6,027,406 A | 2/2000 | Yazici |
| 6,104,608 A | 8/2000 | Casinelli et al. |
| 6,267,665 B1 | 7/2001 | Akhtar |
| 6,402,612 B1 | 6/2002 | Akhtar et al. |
| 6,454,527 B1 * | 9/2002 | Nishiyama et al. ......... 415/119 |
| 6,537,490 B1 | 3/2003 | Han |

FOREIGN PATENT DOCUMENTS

| | | |
|---|---|---|
| DE | 32 36 568 | 4/1984 |
| DE | 34 01 210 | 7/1985 |
| JP | 1-114696 | 5/1989 |

OTHER PUBLICATIONS

Evapco AT Cooling Towers Engineering Manual, pp. 1, 3, 8, 9 and 31 (published prior to the U.S. filing date).
Evapco LSTA Cooling Towers, Bulletin 3041, 1999, pp. 1–5.
Energy Efficiency Manual by D.R. Wulfinghoff, C.2.4.4 In Gravity–Flow Cooling Towers, Ensure Proper Water Distribution, 1999 pp. 307–309.

* cited by examiner

Primary Examiner—Scott Bushey
(74) Attorney, Agent, or Firm—Barry R. Lipsitz; Douglas M. McAllister (57) ABSTRACT

A sound attenuating apparatus for mounting on a heat exchanging apparatus such as a cooling tower, this apparatus having an attenuator housing with vertically extending sides, a top cover and a bottom adapted for mounting on the tower. There is an annular air inlet in the bottom and an air outlet is formed in at least one of the sidewalls. Perforated interior walls are mounted in the housing and define an /airflow passageway that extends from the air inlet to the air outlet. These walls include a first annular wall section extending about and defining an outer circumferential portion of the airflow passageway and a second wall section with that is annular and extends about a substantially vertical central axis. The latter wall section defines an inner circumferential portion of the passageway. The second wall section extends generally upwardly and outwardly from the air inlet. Sound absorbing material is arranged behind the perforated walls.

11 Claims, 7 Drawing Sheets

OUTLET SILENCER FOR COOLING TOWER, EVAPORATOR COOLER OR CONDENSER

This application is a divisional of prior application Ser. No. 10/150,636, filed May 17, 2002, now abandoned.

BACKGROUND OF THE INVENTION

This invention relates to sound attenuators or sound reducing devices and in particular to attenuators designed for use on cooling tower, condensing units, evaporative coolers, and similar heat exchanging apparatus.

The use of and construction of cooling towers which can be used to cool large quantities of a liquid such as water is well known in industry. A common type of cooling tower removes heat from water by means of evaporation of some of the water into air that is circulated to the tower. Such cooling towers are often used where water is in limited supply, where there is a need to avoid an undue temperature increase of natural water bodies in the area, where there is a need for water conservation, or where there is a need to avoid pollution.

The more usual types of cooling towers include the forced draft type, the induced-draft type and the hyperbolic tower type. In the first type, one or more fans can be mounted at ground level on or in the tower and these fans can be axial fans or centrifugal fans. Because of the location of these fans, they can be conveniently inspected and maintained. The fans cause air to flow through packing located in the tower structure and water can be piped into the tower to flow down and over this packing to the bottom of the tower where it is collected and then removed. The air flow exits through the top of the tower.

In the induced-draft tower, which is more prevalent in the U.S., an axial fan rotating about a vertical axis can be mounted at the top of the tower structure where the air also exits from the tower. Because of the location of the fan, there is in improved air distribution within the cell of the tower. Again water flows into the tower at an upper level and then flows down through packing located in the tower to a lower level where it is collected and removed. In a counterflow type of tower, the air is introduced into the tower from below while in a crossflow type, air is introduced through openings in the sides of the tower.

The hyperbolic cooling tower utilizes a chimney effect for natural air circulation and thus it does not require the fans of the aforementioned types of cooling towers. This type of cooling tower is not of interest for purposes of the present invention which is directed to reducing the noise level exiting from a cooling tower because of the fan or fans operating therein.

It will be appreciated by those skilled in the art that the construction of both forced-draft and induced-draft towers is well known in the art of cooling liquids such as water for industrial purposes. However one known difficulty with the use of such cooling towers that employ large fans is that they can generate excessive noise, particularly if the cooling towers are to be located in a populated area or in areas where workman or others may frequently be located. Although attempts have been made in the past to reduce the noise level from these cooling towers by the use of sound attenuating apparatus or other means, there remains the need to provide more efficient and better sound attenuating apparatus for use with such cooling towers, particularly apparatus designed for use on top of the cooling tower where the air outlet is normally located.

One known type of sound attenuator that has been used in the past is the type sold by Evapco for its cooling towers that employ centrifugal fans in the bottom thereof. These known sound attenuators include an exterior housing with elongate, straight splitters arranged in the housing between which either the inlet air flow or the outlet air flow must pass. In the case of the fan inlet attenuator, the splitters extend vertically from the bottom to the top of the inlet silencer. In the case of a discharge silencer, these splitters can extend from one vertical sidewall of the housing to an opposite vertical sidewall and they are evenly spaced apart and parallel. The splitters in these silencers can be insulated by the use of sound attenuating material arranged in each splitter. One difficulty with these known discharge silencers is that they are rectangular in plan view while often the outlet opening at the top of a cooling tower is circular, particularly if an axial fan is arranged in the top section of the tower which is often the case with an induced-draft tower.

U.S. Pat. No. 4,232,729 which issued Nov. 11, 1980 to J. P. Ingram et al. describes an air cooled heat exchanger for cooling an industrial liquid, this heat exchanger employing an axial fan that rotates about a vertical axis. Arranged in the top section of the apparatus are a plurality of externally ribbed, hollow cooling sections which are arranged in a plurality of parallel rows. The air flow enters the fan from the bottom of the apparatus and is blown by the fan through these cooling sections to exit from the top of the apparatus. No outlet silencer is provided at the top of this known heat exchanger apparatus.

The use of evaporative coolers and condensing units is also well known in the heat exchanger art. In such coolers, a cooling media is circulated through a cooling coil (horizontal) located below a rotating fan.

It is an object of the present invention to provide an improved sound attenuating apparatus that can be mounted on a cooling tower, condensing unit, or evaporative cooler, this apparatus being very effective at reducing noise levels that can be created by a fan or fans in the tower or unit while at the same time not significantly affecting the efficiency of the cooling tower, condensing unit, or evaporative cooler.

It is a further object of the present invention to provide an improved sound attenuating apparatus suitable for a cooling tower, condensing unit, or evaporative cooler, which can be manufactured and supplied at a reasonable cost.

SUMMARY OF THE INVENTION

According to one aspect of the invention a sound attenuating apparatus for mounting on a heat exchanging apparatus such as a cooling tower, evaporative cooler, condensing unit, and the like comprises an attenuator housing having vertically extending sides defined by exterior sidewalls, a top cover defined by an exterior top wall, and a bottom adapted for mounting on the heat exchanging apparatus. An annular air inlet is formed in the bottom and a main air outlet is formed in at least one of the sidewalls. Perforated interior walls are mounted in the housing and define an airflow passageway that extends from the air inlet to the main air outlet. The interior walls include a first annular wall section extending about and defining an outer circumferential portion of the airflow passageway and a second wall section that is substantially annular, that extends about a substantially vertical central axis, and that defines an inner circumferential portion of the air flow passageway. The second wall section extends generally upwardly and outwardly from the annular air inlet. Sound absorbing material is arranged behind the perforated interior walls on the sides thereof opposite the airflow passageway.

In a preferred embodiment, the second wall section is substantially conical in shape and diverges upwardly and outwardly about its circumference. An optional preferred feature of the apparatus is a sound reducing resonator located at the air inlet and extending about the outer circumference of the air inlet.

According to a further aspect of the invention, a combined cooling tower and sound attenuating apparatus includes a cooling tower system including a tower structure, a fan unit mounted in the tower structure and arranged to circulate an air flow through the tower system for exit through an opening located in the top of the tower structure, and a liquid circulation system mounted in the tower structure and capable of circulating a liquid in the tower system so that liquid can be cooled by the air flow. The combination further includes an attenuator housing having a vertically extending wall portion, a top cover, and a bottom. This housing is mounted on the top of the tower structure and has an air inlet formed in the bottom and arranged and aligned to receive the air flow from the opening. The housing further has an air outlet formed in the vertically extending wall portion. There are perforated interior walls mounted in the housing and these define an air flow passage that extends from the air inlet to the air outlet. The interior walls include inner and outer annular wall sections extending around a substantially vertical central axis. The inner wall section extends generally upwardly and outwardly from the air inlet. Sound absorbing material is arranged behind the perforated interior walls on sides thereof opposite the air flow passage.

In a preferred embodiment, the inner annular wall section is substantially conical in shape and diverges upwardly and outwardly about its circumference. Also in one preferred form of this combination the fan unit is an axial fan rotatable about a substantially vertical axis and located adjacent the top of the tower structure.

According to another aspect of the invention, a sound attenuating apparatus for mounting on a heat exchanging apparatus such as a cooling tower, evaporative cooler, condensing unit, and the like, includes an attenuator housing arrangement having a top cover section, a bottom adapted for mounting on the heat exchanging apparatus, and exterior sides defined by sidewalls extending upwardly from the bottom. The housing also includes annular air inlets formed in the bottom and at least one air outlet formed in the exterior sides. There are also perforated interior walls mounted in the housing arrangement and these define air flow passageways that extend from the air inlet to the at least one air outlet. The interior walls include inner wall sections and outer wall sections arranged in pairs so that each pair comprises one of the inner wall sections and one of the outer wall sections. The wall sections of each pair extend around a substantially vertical central axis. Each inner wall section extends generally upwardly and outwardly from a respective one of the air inlets. Each outer wall section extends about its respective inner wall section and is spaced therefrom. Sound absorbing material is arranged behind the perforated interior walls on sides thereof opposite the airflow passageways.

In one preferred embodiment, each outer wall section includes a lower wall portion that tapers inwardly and upwardly and an upper wall portion that diverges outwardly and upwardly.

According to still another aspect of the invention, a combined condenser unit and sound attenuating apparatus comprises a condenser system including a condenser housing forming an airflow passageway and an air outlet opening located in a top of said housing, a fan unit mounted in said housing and arranged to circulate an airflow through said housing for exit through said outlet opening, and a fluid circulation system capable of circulating a heat exchanging fluid in said condenser system so that said fluid can be cooled by said airflow. An attenuator housing having a vertically extending wall portion, a top cover, and a bottom end, the attenuator housing being mounted on top of the condenser system and having an air inlet formed in said bottom end and arranged to receive said airflow from the outlet opening. The attenuator housing has an attenuator air outlet formed in its vertically extending wall portion. Perforated interior walls are mounted in the attenuator housing and define an airflow passage that extends from the air inlet to the attenuator air outlet, these interior walls including inner and outer annular wall sections extending around a substantially vertical central axis. The inner wall section extends generally upwardly and outwardly relative to the central axis. Sound absorbing material is arranged behind the perforated interior walls on sides thereof opposite the airflow passage.

Further features and advantages of the sound attenuating apparatus of this invention will be apparent from the following detailed description when considered in conjunction with the accompanying drawings.

DETAILED DESCRIPTION OF PREFERRED EMBODIMENT

Figure 1:
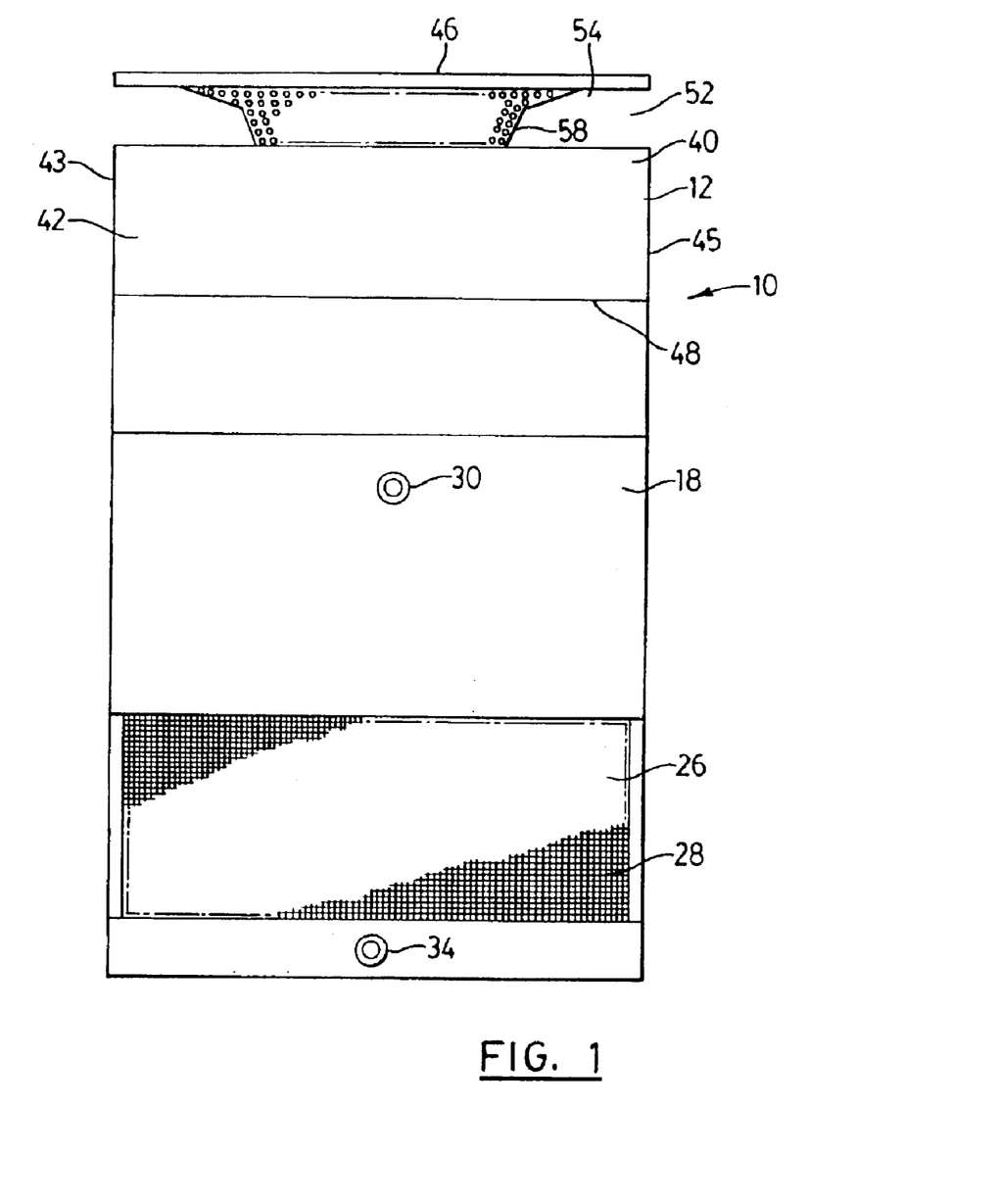
FIG. 1 is a side elevation of a standard induced-draft cooling tower equipped with a sound attenuating apparatus constructed in accordance with the invention.
Figure 6:
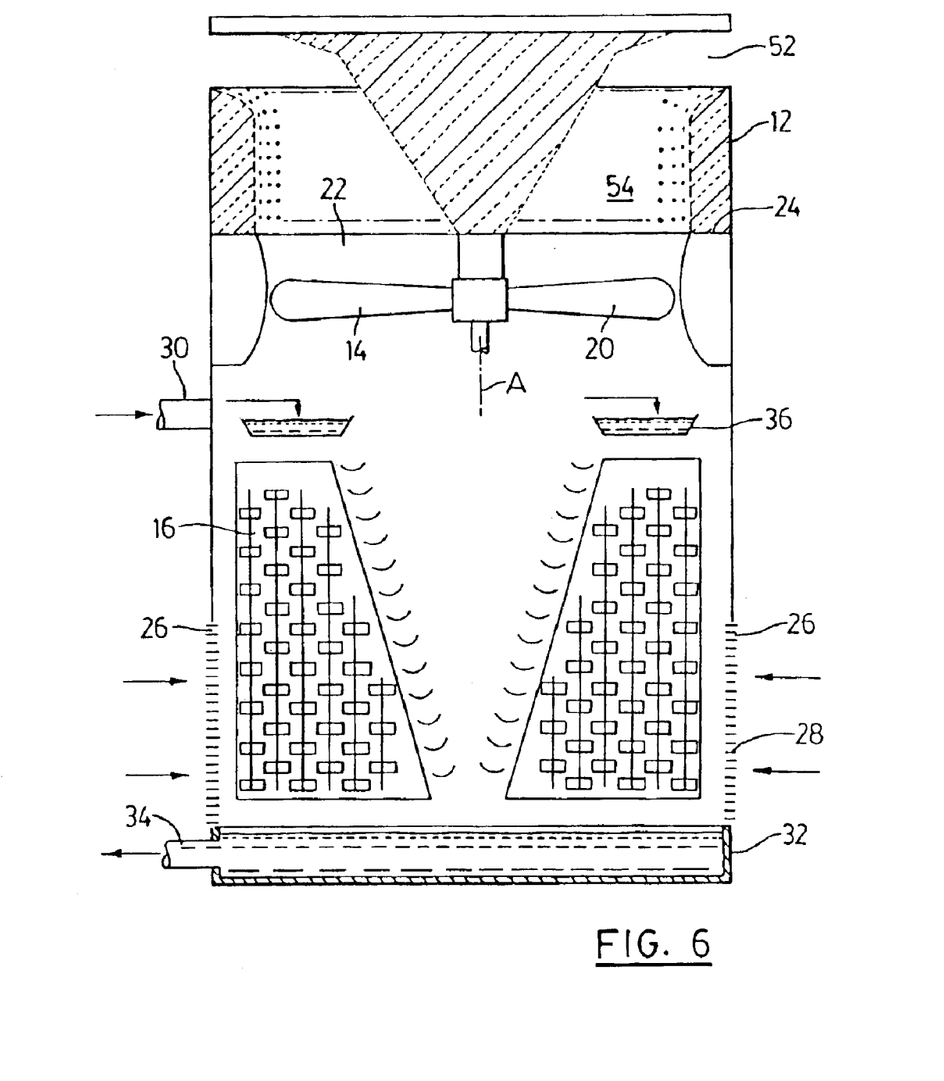
FIG. 6 is a schematic illustration in cross-section illustrating the interior components of the cooling tower of FIG. 1 provided with the sound attenuating apparatus of the invention.

FIG. 1 of the drawings illustrates a standard form of cooling tower which has been modified by the addition of a sound attenuating apparatus 12 constructed in accordance with the invention. The standard interior components of this cooling tower 10 are illustrated in FIG. 6 to which reference will also be made at this time. It will be understood that the cooling tower 10 is a standard induced-draft tower except for the outlet silencer mounted thereon and these cooling towers are commonly used in industry to cool water and other liquids. One or more axial fans 14 can be mounted in the top section of the tower above a packing cell 16. The cooling tower includes a tower structure 18 which is generally hollow so that it can contain the packing and the aforementioned one or more fans. The axial fan 14 is rotatably mounted in the tower structure and generally the blades 20 of each fan rotate about a vertical axis located at A. It will be understood that the fan can be rotated by a suitably mounted electric motor (not shown) either directly or by means of drive belts. The fan unit or units are arranged to circulate an air flow through the tower for exit through an opening 22 located in a top 24 of the standard tower structure. Outside air is pulled into side inlets 26 which can be arranged near the bottom of the cooling tower. In the illustrated preferred embodiment, the side inlets can extend the entire width and depth of the tower and be located on all four vertical sides of the tower. Preferably these side inlets are covered with a suitable metal screen 28 or gridwork. The liquid, usually water, enters through an inlet pipe 30 which can enter the tower structure at a level above the packing cell 16. After flowing downwardly through the packing cell, the liquid is collected in a bottom container or tray 32 usually located at the bottom of the tower structure from which the liquid or water can exit through drainpipe 34 which may be connected to a suitable pump (not shown) in order to deliver the liquid to a desired apparatus, such as a condenser for further handling.

It will be understood that the cooling tower or cooling tower system is equipped with a liquid circulation system, such as the above described system, that is mounted in the tower structure and is designed for the particular application. This liquid circulation system is capable of circulating a liquid, i.e. water, in the tower so that the liquid can be cooled by the air flow. The liquid circulation system illustrated in FIG. 6 includes the aforementioned inlet pipe 30 which delivers water to shallow trays 36 from which the water can drain through orifices to the fill material or the packing 16. The water circulation system further includes bottom collecting container or tray 32 and outlet pipe 34.

Figure 2:
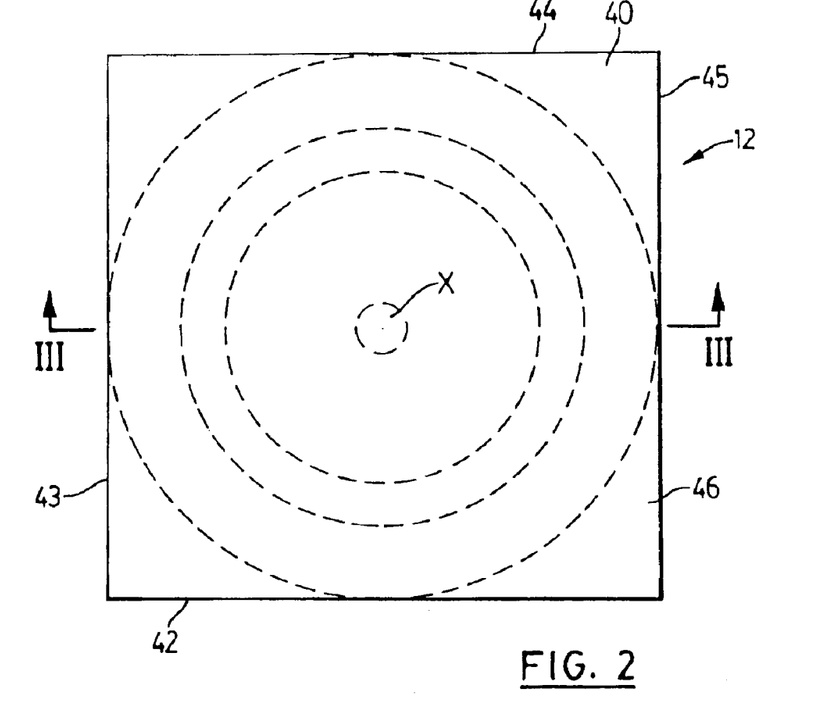
FIG. 2 is a top view of the sound attenuating apparatus used on the cooling tower of FIG. 1.

One difficulty that can arise with the above described cooling tower is that a significant amount of sound can escape from the top of the tower as a result of the operation of the fan unit which is located adjacent the top of the standard tower structure as shown. The present invention is directed to the provision of the sound attenuating apparatus 12 for mounting on the cooling tower 10. The preferred apparatus 12 includes an attenuator housing 40 having vertically extending sides such as the four equal sides 42 to 45 illustrated in FIGS. 2 and 3 or a cylindrical sidewall (not shown). These sides are defined by exterior side walls that can be made of a suitable sheet metal such as galvanized steel or stainless steel. The housing also includes a top cover 46 that is defined by an exterior top wall which can also be made from sheet metal. The housing includes a bottom 48 adapted for mounting on the cooling tower 10. As illustrated, the horizontal dimensions of the attenuating apparatus correspond to the horizontal dimensions of the top of the tower and thus the attenuator can rest on top of the tower and can be secured thereto by a suitable fastening means, for example metal strips and suitable bolts. It is also possible to construct the attenuating apparatus so that its horizontal dimensions are smaller than the top of the tower. The housing 40 also has an annular air inlet 50 which can more clearly be seen in FIG. 8. This inlet is formed in the bottom 48 and it will be understood that the size of this inlet can be made to correspond to the size of the circular opening 22 located in the top of the tower structure. Thus there can be a smooth flow of exiting air from the top of the tower structure into the attenuator. The housing also has an air outlet 52, sometimes hereinafter referred to as the main air outlet, which as illustrated is open on all four sides of the attenuator housing. Instead of a rectangular or square top cover 46, the top cover 46 can be circular (as suggested in FIG. 8). The air outlet 52 shown in FIG. 2 is substantially circular. In any event, the air outlet is formed in at least one of the sidewalls of the housing and preferably more than one of these sidewalls.

The preferred attenuating apparatus also has perforated interior walls that are mounted in the housing 40 and that define an air flow passage 54. This passageway extends from the air inlet 50 to the air outlet 52. The aforementioned interior walls include a first annular wall section 56 that extends about and defines an outer circumferential portion of the airflow passageway 54. The interior walls also include a second wall section 58 that is substantially annular and extends about a substantially vertical central axis indicated by the letter X in FIGS. 2, 3 and 8. The second wall section defines an inner circumferential portion of the airflow passageway 54. As illustrated, this second wall section 58 extends generally upwardly and outwardly from the annular air inlet 50 about the circumference of this second wall section.

Figure 3:
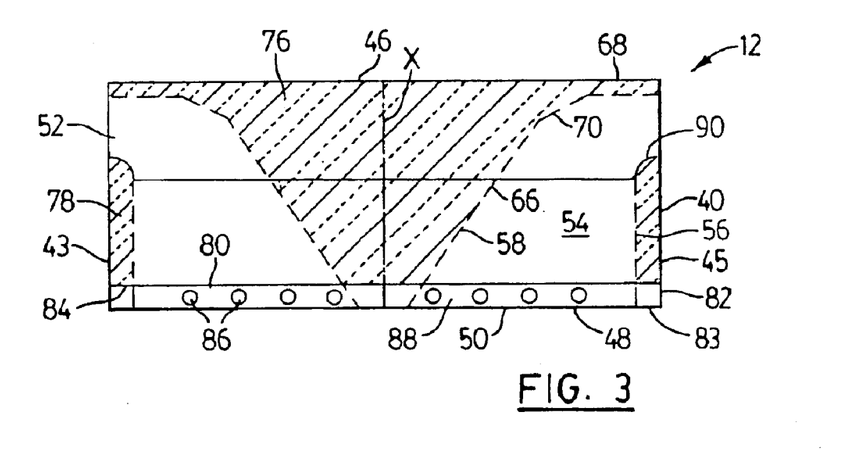
FIG. 3 is a cross-sectional elevation taken along the line III—III of FIG. 2.
Figure 8:
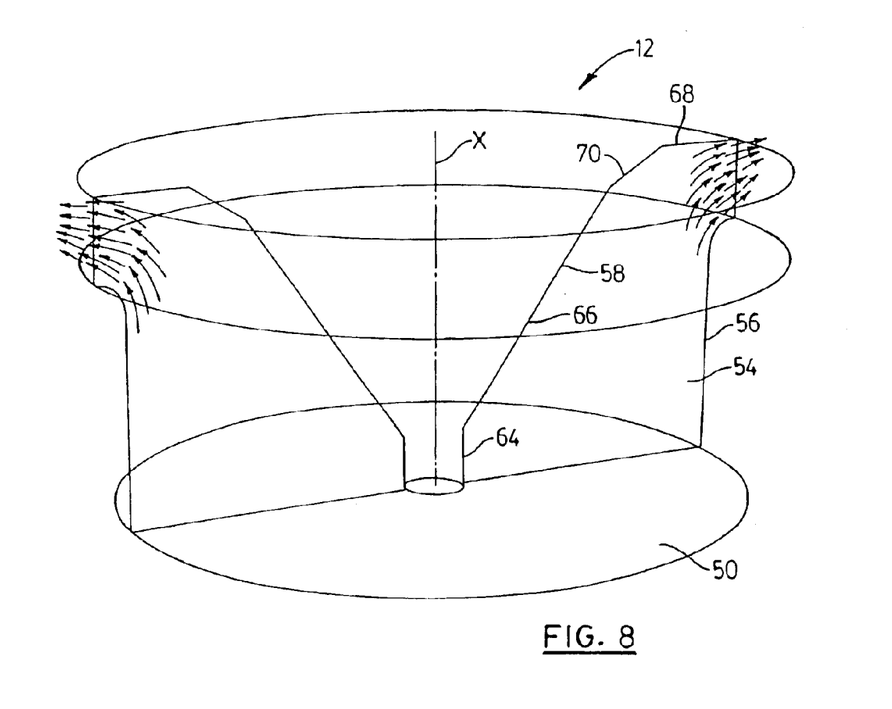
FIG. 8 is a schematic illustration in perspective showing the airflow in the sound attenuating apparatus of FIGS. 2 and 3.

The preferred second wall section 58 is substantially conical in shape and diverges upwardly and outwardly about its circumference as illustrated by FIGS. 3 and 8. In the embodiment illustrated schematically in FIG. 8, the second wall section includes a lowermost portion 64 having a cylindrical shape, an intermediate portion 66 which is substantially conical in shape and slopes upwardly and outwardly and a top portion 68 that extends horizontally and outwardly to the aforementioned air outlet 52. If desired, the conical portion can itself be formed from two or more sections, each of which is a partial cone. In addition to the main conical section, there can be a shorter, upper conical portion 70. The purpose of this upper conical portion is to provide for a more gradual transition to smooth the airflow from an upwards path to a horizontal path. In one preferred embodiment the angle of slope of the conical section 70 is approximately 25 degrees to the horizontal or 65 degrees relative to the central axis X. In the same preferred embodiment, the angle of slope of the main conical section 66 is approximately 55 degrees to the horizontal or approximately 35 degrees to the central axis X.

Sound absorbing material, for example compressed fibreglass batting is located at 76 and 78 behind the perforated interior walls at 56 and 58 on the sides thereof opposite the airflow passageway 54. Other forms of sound absorbing material are also known in the air handling industry and can be used in place of fibreglass batting but it will be understood that the desirability of alternative materials will be dependent upon the particular use to which the cooling tower is to be put, cost constraints, etc.

An optional feature of the illustrated sound attenuator is the use of a sound reducing resonator indicated generally at 80 and located at the air inlet 50. The preferred resonator extends about the outer circumference of the air inlet 50 and can comprise a substantially enclosed annular chamber including exterior wall 82, bottom wall 83, inner wall 88, and top wall 84. The preferred resonator has a plurality of holes 86 which are formed in the inwardly facing inner wall 88 of the resonator. The inner wall 88 is directly below and aligned with the interior wall 56. Preferably these holes 86 are distributed evenly about the circumference of the resonator. The design of such sound reducing resonators is well known in the air handling art and accordingly a detailed description of their design herein is deemed unnecessary. The use of this resonator is described for example in U.S. Pat. No. 5,587,563 issued Dec. 24, 1996 to Yazici et al. and the disclosure and the drawings of this U.S. patent are incorporated herein by reference.

To briefly explain one preferred construction of the resonator, the walls of the resonator can be made of 16 gauge sheet metal and they are imperforate except for the aforementioned holes 86. The holes can have a diameter of about 1 inch. A resonator of this type provides means for changing the acoustic impedance of the air flow passing through the passageway 54. The resonator chamber is constructed so as to attenuate the predetermined fan blade passage frequency of a predetermined range that is dependent upon the particular fan unit to be used in the tower.

In the embodiment of FIGS. 2 and 3, the outer annular wall section 56 is substantially cylindrical for most of its height and it extends upwardly to the air outlet 52. At the top of the cylindrical portion, this wall section in cross-section curves outwardly at 90 bending through a 90 degrees curve. It will also be appreciated that the depth of the insulation behind the wall section 56 will vary substantially if the attenuator housing 40 is square or rectangular in plan view. Thus the thickness of the insulation can be much greater in the corner regions, helping to increase the sound attenuating properties of the unit.

A variant of the sound attenuating apparatus will now be described with particular reference to FIGS. 4, 5 and 9 of the drawings. It should be appreciated that often cooling tower installations are constructed in modules with the number of modules depending on the required capacity of the system. There can for example be two, three, four or more cooling tower modules similar to the cooling tower of FIG. 1 mounted side by side and generally connected to one another so that together they provide the required cooling capacity. In the embodiment illustrated in FIGS. 4, 5 and 9, there are in effect two sound attenuating units connected together for mounting on a cooling tower apparatus comprising either two cooling tower units connected together or comprising a single large cooling tower having two annular air outlets arranged in the top thereof.

Figure 4:
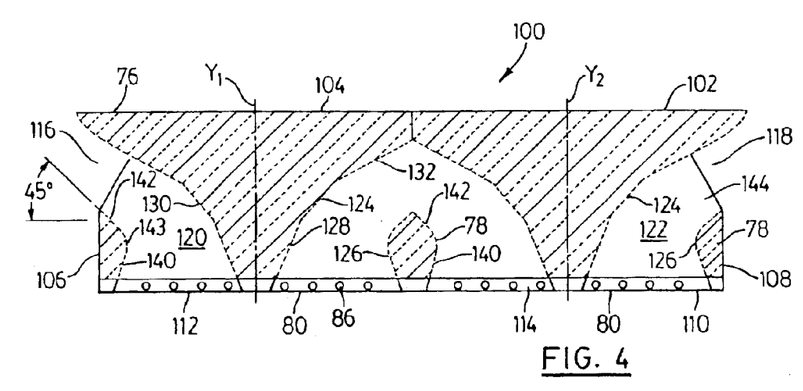
FIG. 4 is a cross-sectional elevation of a second embodiment of the sound attenuating apparatus of the invention, this view being taken along the line IV—IV of FIG. 5.
Figure 5:
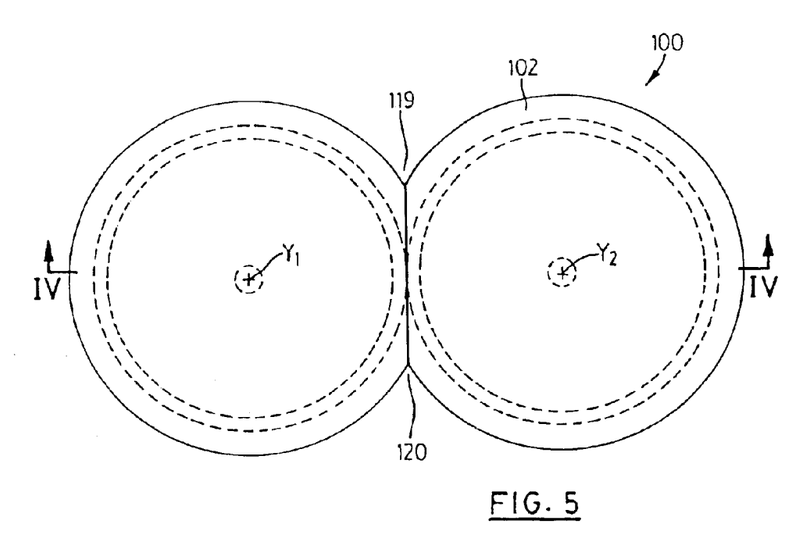
FIG. 5 is a top view of the sound attenuating apparatus of FIG. 4.
Figure 9:
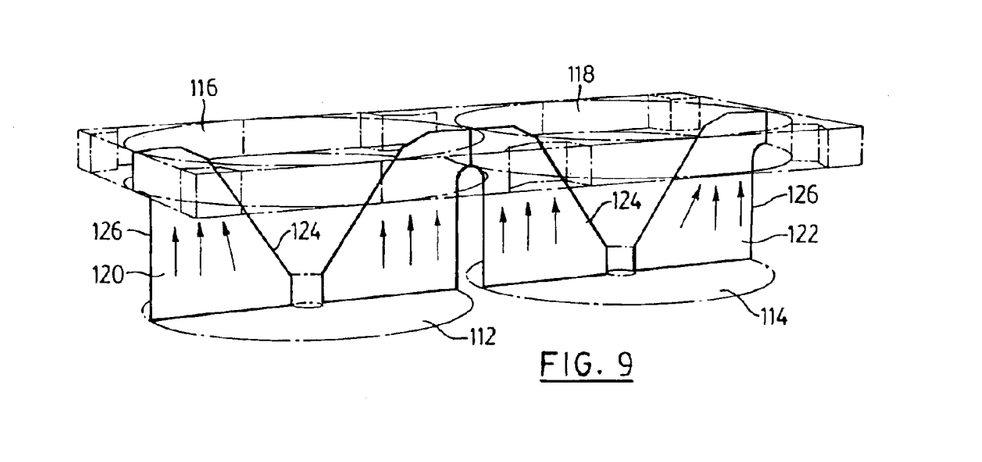
FIG. 9 is a schematic illustration in perspective showing the airflow through a sound attenuating apparatus similar to that illustrated in FIGS. 4 and 5.

The sound attenuating apparatus of FIGS. 4, 5 and 9 is indicated generally by reference 100. The apparatus 100 as in the first embodiment of FIGS. 2 and 3, also have an attenuator housing arrangement 102 that includes a top cover section 104 and a bottom adapted for mounting on the cooling tower system. The housing arrangement further includes exterior sides defined by side walls 106 and 108 which, as illustrated in FIGS. 4 and 5, can be substantially cylindrical in shape. These sidewalls extend upwardly from the bottom 110. The illustrated housing arrangement also includes two annular air inlets 112 and 114 formed in the bottom and at least one air outlet formed in the exterior sides. In the embodiment of FIGS. 4 and 5, it is possible to consider the apparatus as having two air outlets indicated at 116 and 118 with each outlet extending horizontally through a substantial arc of more than 270 degrees so that the two outlets are joined at 119 and 120 (see FIG. 5).

The attenuating apparatus 100 also has perforated interior walls mounted in the housing arrangement and defining two airflow passageways 120 and 122 that extend from the air inlet 112,114 to the air outlet 116,118. These interior walls include inner wall sections, 124 and outer wall sections 126 arranged in pairs so that each pair comprises one of the inner wall sections and one of the outer wall sections. The wall sections of each pair extend around a substantially vertical axis, two of which are indicated at $Y_1$ and $Y_2$ in FIGS. 4 and 5. As in the first embodiment of FIGS. 2 and 3, each inner wall section extends generally upwardly and outwardly from a respective one of the air inlets 112,114 about the circumference of the inner wall section. Also each inner wall section is substantially conical in shape and diverges upwardly and outwardly about its circumference. In the illustrated embodiment of FIG. 4, the conical inner wall section is divided into a lower portion 128, an intermediate portion 130, and an upper portion 132. In one preferred embodiment, the lower portion extends at a slope to the horizontal plane of almost 70 degrees. The intermediate portion 130 is sloping at a slightly smaller angle to the horizontal while the upper portion 132 extends at an even smaller angle to the horizontal, for example an angle of about 30 degrees.

Each outer wall section of the interior walls extends about its respective inner wall section and is spaced therefrom as shown. In the preferred embodiment of FIG. 4 the outer wall section has a lower wall portion 140 that tapers inwardly and upwardly and an upper wall portion 142 that diverges outwardly and upwardly with the two portions meeting along a smooth convex curve at 143. Also in the preferred illustrated embodiment the upper wall portion 142 extends at an angle to the horizontal plane of about 45 degrees. In this way it will be seen that each airflow passageway 120,122 includes an upper passage section 144 that extends to the air outlet and that slopes radially outwardly and upwardly. This arrangement can assist the sound attenuating characteristics of the apparatus as it will tend to direct the sound upwardly into the atmosphere rather than horizontally where it is more apt to affect persons working or living in the area.

Of course in this embodiment as well, the sound absorbing material 76,78 arranged behind the perforated interior walls on the sides thereof opposite the airflow passageways 120,122. This material as indicated can comprise compressed fibreglass batting. In the embodiment of FIGS. 4 and 5 there is also provided a sound reducing resonator 80 at each air inlet with each resonator extending about the circumference of its respective air inlet.

Figure 7:
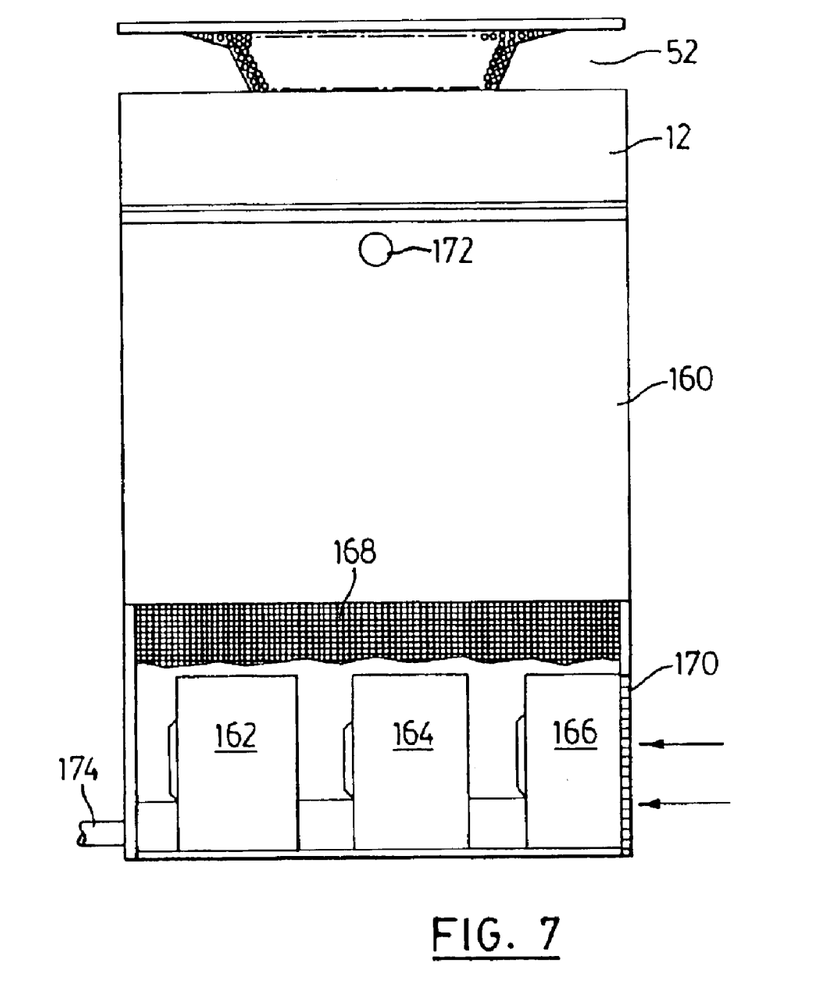
FIG. 7 is a side elevation of a forced-draft cooling tower employing three centrifugal fans in the bottom thereof and equipped with the sound attenuating apparatus of the invention.

FIG. 7 illustrates an alternate form of cooling tower 160 on which the sound attenuating apparatus 12 of the present invention can be mounted. The cooling tower 160 is a standard type of mechanical, forced-draft tower which can employ one, two or more fan units located in the bottom section of the tower. The illustrated cooling tower is shown with three centrifugal fan units 162,164 and 166 arranged one beside the other and mounted at the bottom of the tower. For purposes of illustration, only the upper portion of a covering screen 168 is shown in FIG. 7. It will be understood that this screen would normally cover the illustrated side of the cooling tower for safety purposes and to protect the fan units. Air can enter into the inlet of the fan unit 166 through an opening 170. As in the tower of FIGS. 1 and 6, the cooling air will enter into the bottom of the tower through the sides thereof and exit through the outlet 52 of the sound attenuating apparatus 12. It will be seen that in this arrangement the fan units 162,164 and 166 are conveniently located for inspection or maintenance at ground level. The water or other liquid to be cooled can enter the tower through inlet pipe 172 and the cooled water can exit through outlet or drain 174 located at the bottom of the tower and below the packing which is located in the tower.

It will be appreciated by those skilled in the art that it is also possible to provide sound attenuating apparatus at the air inlet or air inlets of the cooling tower to further reduce the level of sound that escapes from the tower. These air inlet attenuators can be of standard construction such as those inlet attenuators available from Evapco.

It will be understood that the initial layer of fibreglass insulation behind the perforated metal of the interior walls can, in a known manner, be a relatively thin layer of fibreglass insulation which has a cloth backing. This initial layer can for example be ½ inch thick. A suitable form of this insulation is Knauf Ductliner-M which has a 0 erosion of the fibreglass insulation at air velocities of up to 6000 feet per minute. The cloth backing of this material lies directly against the perforated metal sheets. Behind this material is a standard low density acoustical filler which is used to fill the reminder of the cavity.

The preferred material for the imperforate sheet metal walls of the sound attenuator is 16 gauge galvanized sheet metal.

The preferred sound attenuating apparatus can be strengthened by using internal partition walls (not shown) which in a known manner helps to increase the rigidity and strength of the apparatus. The arrangement and spacing of these walls can vary depending upon the particular structural support required. The space between these partition walls is filled with the aforementioned fibreglass insulation and the partitions can help to support this insulation as well as the interior perforated walls which are relatively thin. By perforated sheet metal it will be understood for purposes of this description that the sheet metal has a grid work of small perforations extending over all or a portion of its surface. As the use of such perforated sheet metal is well known in the air handling industry per se for use in sound attenuators, further description of this type of sheet metal herein is deemed unnecessary.

Figure 10:
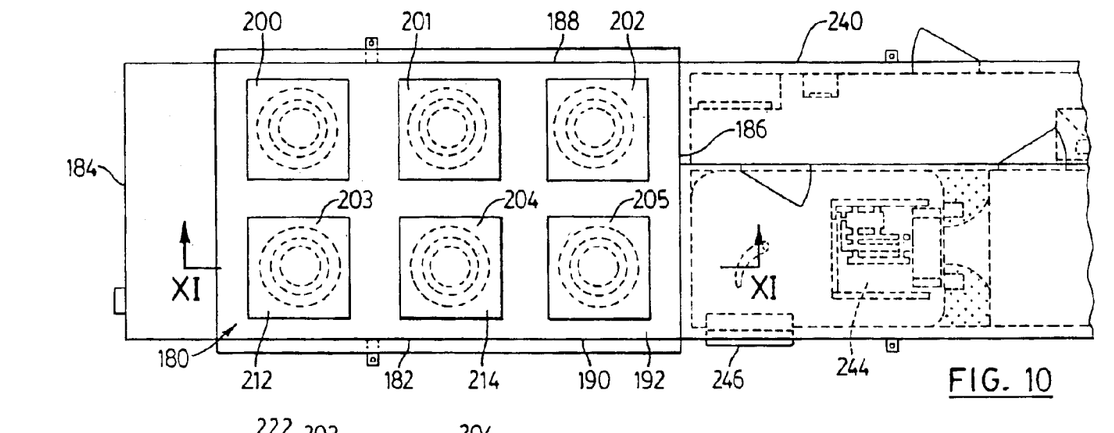
FIG. 10 is a plan view illustrating six sound attenuating apparatus mounted on top of a condenser unit.
Figure 11:
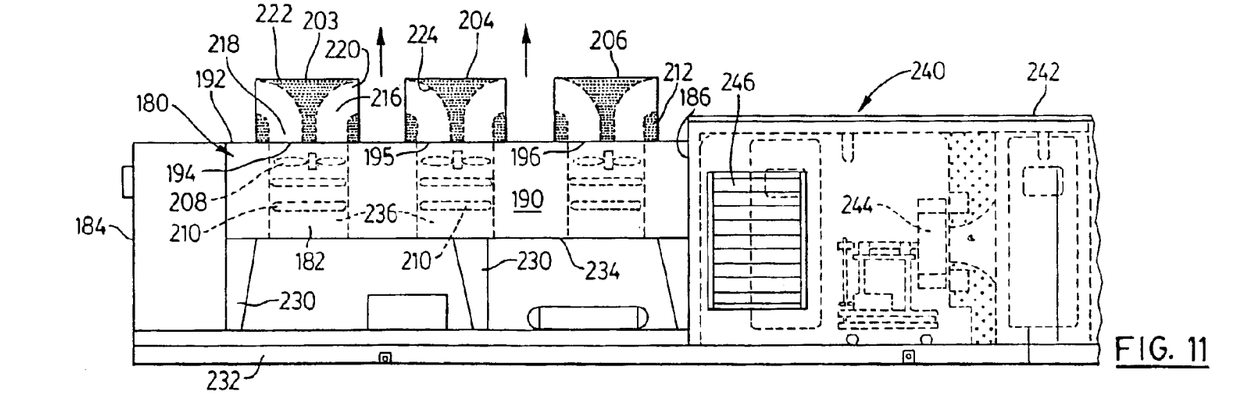
FIG. 11 is a side elevation of the condenser unit of FIG. 10 with the sound attenuating apparatus shown in cross-section along the line XI—XI of FIG. 10.

FIGS. 10 and 11 of the drawings illustrate the use of a sound attenuating apparatus constructed in accordance with the invention on a condenser or condensing unit 180. The condenser can be of standard construction and it can include a condenser housing 182 that can be generally rectangular as shown. The illustrated housing has vertical end walls 184, 186 and vertical side walls 188,190. The illustrated housing is formed with six annular or circular air outlet openings in its top 192. Three of these outlet openings are indicated at 194 to 196 in FIG. 11. These outlet openings are located directly below six separate attenuator housings 200 to 205 constructed in accordance with the invention. Although six attenuator housings are illustrated, it will be appreciated that there can be as few as one attenuator housing mounted on the condenser and there can be up to six or more attenuator housings, depending on the number of outlet openings formed in the top of the condenser. At least one fan unit illustrated schematically at 208 in FIG. 11 is mounted in the housing and is arranged to circulate an air flow through the housing for exit through the outlet opening located directly above it. It will be understood that in the illustrated condenser there are six of these fan units in the form of axial fans whose blades rotate about a vertical axis. Also, in a well known manner, the condenser includes a fluid circulation system capable of circulating a heat exchanging fluid in the condenser so that the fluid can be cooled by the air flow that passes upwardly through the condenser housing. The fluid being circulated can either be a suitable gas or a liquid such as water. Illustrated schematically in FIG. 11 are horizontally extending fluid circulation pipes or coils 210.

It will be understood that each of the sound attenuating apparatus can be constructed according to the sound attenuating apparatus described above and illustrated in FIGS. 2 and 3 of the drawings. In particular, the apparatus includes an attenuator housing 212 having a top cover 214 which, as illustrated, is substantially square. The attenuator also has perforated interior walls mounted in this housing and defining an airflow passage 216 that extends from the air inlet 218 of the attenuator to its air outlet 220. Again, sound absorbing material 222 is arranged behind the perforated interior walls on sides that are opposite the air flow passage 216. The preferred inner annular wall section 224 is substantially conical in shape and diverges upwardly and outwardly about its circumference.

Also illustrated in FIG. 11 are several support legs 230 for the condenser which forms openings for the admission of air into the condenser housing. These legs can be mounted on a base support 232 in the form of a strong, rigid frame. It will be understood that there are openings located in the bottom 234 of the condenser housing and it is through these openings that air flows upwardly through air flow passageways 236 formed in the condenser housing. These passageways direct the air through the aforementioned condenser coils 210 and thus the air acts to cool the heat exchanging fluid passing through these coils.

In the illustrated preferred embodiment of the condenser, each fan unit comprises an axial fan rotated about a substantially vertical axis and the fan unit 208 is located in a top section of the condenser housing. Thus, in the illustrated condenser, the fan acts to pull the incoming air through the condenser coils.

In the illustrated apparatus of FIGS. 10 and 11, the condenser system is shown beside an air handling system indicated generally by 240. Only part of this air handling system is shown and it will be understood that this air handling system can be constructed in a known manner. The illustrated air handling system includes an exterior housing 242 and a movable fan unit 244. Supply air can exit from the housing 242 through a side air outlet 246. It will be understood that incorporated into this air handling unit can be a bank of cooling coils through which the aforementioned heat exchange fluid is passed in order to cool the air flow before it exits through the outlet 246. Once the fluid in these coils is heated by the air flow through the air handling unit, this fluid is then conducted to the condenser where it is cooled and condensed by the air flow passing through the condenser.

It will be appreciated by those skilled in the art that various modifications and changes can be made to the illustrated and described sound attenuating apparatus of this invention without departing from the spirit and scope of this invention. Accordingly all such modifications and changes as fall within the scope of the appended claims are intended to be part of this invention.

We claim:

1. A combined cooling tower and sound attenuating apparatus, said combination comprising:
   a cooling tower system including a tower structure, a fan unit mounted in said tower structure and arranged to circulate an airflow through said tower system for exit through an opening located in a top of said tower structure, and a liquid circulation system mounted in said tower structure and capable of circulating a liquid in said tower system so that liquid can be cooled by said air flow;

an attenuator housing having a vertically extending wall portion, a top cover, and a bottom, said housing being mounted on said top of said tower structure and having an air inlet formed in said bottom and arranged and aligned to receive said air flow from said opening, said housing further having an air outlet formed in said vertically extending wall portion;

perforated interior walls mounted in said housing and defining an airflow passage that extends from said air inlet to said air outlet, said interior walls including inner and outer annular wall sections extending around a substantially vertical central axis, said inner wall section extending generally upwardly and outwardly from said air inlet; and sound absorbing material arranged behind said perforated interior walls on sides thereof opposite said airflow passage.

2. A combination according to claim 1 wherein said inner annular wall section is substantially conical in shape and diverges upwardly and outwardly about its circumference.

3. A combination according to claim 2 wherein said fan unit comprises an axial fan rotatable about a substantially vertical axis and said fan unit is located adjacent said top of the tower structure and wherein said air flow enters said tower system through one or more tower inlets located in one or more sides of said tower system.

4. A combination according to claim 2 including a sound reducing resonator located at said air inlet and extending about the circumference of said air inlet.

5. A combination according to claim 2 wherein said sound absorbing material is compressed fiberglass batting.

6. A combination according to claim 2 wherein said outer annular wall section is substantially cylindrical and extends upwardly to said air outlet, which extends about a horizontal perimeter of said housing.

7. A combined cooling tower and sound attenuating apparatus, said combination comprising:

a cooling tower system including a tower structure, a packing cell arranged in said tower structure, a fan unit mounted in said tower structure above said packing cell and arranged to circulate an upward airflow through said packing cell for exit through an opening located in a top of said tower structure, and a liquid circulation system mounted in said tower structure and capable of providing a liquid for contact with and downward flow through said packing cell so that said liquid can be cooled by said airflow;

an attenuator housing having a vertically extending wall portion, a top cover, and a bottom, said housing being mounted on said top of said tower structure and having an air inlet formed in said bottom and arranged and aligned to receive said air flow from said opening, said housing further having an air outlet formed in said vertically extending wall portion;

perforated interior walls mounted in said housing and defining an airflow passage that extends from said air inlet to said air outlet, said interior walls including inner and outer annular wall sections extending around a substantially vertical central axis, said inner wall section extending generally upwardly and outwardly from said air inlet; and sound absorbing material arranged behind said perforated interior walls on sides thereof opposite said airflow passage.

8. A combination according to claim 7 wherein said fan unit comprises an axial fan rotatable about a substantially vertical axis and said fan unit is located adjacent said top of the tower structure and wherein said air flow enters said tower system through one or more tower inlets located in one or more sides of said tower system.

9. A combination according to claim 8 wherein said outer annular wall section is substantially cylindrical and extends upwardly to said air outlet, which extends about a horizontal perimeter of said housing.

10. A combination according to claim 8 wherein said tower inlets are located in vertical sides of the tower structure and are arranged near the bottom of said tower structure.

11. A combination according to claim 8 wherein said liquid circulation system includes trays having orifices which allow water to drain from the trays to a top of said packing cell, an inlet pipe to deliver water to said trays, and a water collecting device located under said packing cell.

* * * * *